United States Patent
Habedank et al.

(10) Patent No.: US 6,778,368 B2
(45) Date of Patent: Aug. 17, 2004

(54) ELECTRICAL SERVICE DISTRIBUTION BOARD

(75) Inventors: Winrich Habedank, Leimen (DE); Peter Heilig, Heidelberg (DE); Richard Kommert, Heidelberg (DE); Heinz-Erich Popa, Bammental (DE); Jörg Puhr-Westerheide, Rauenberg-Malschenberg (DE); Bernd Siedelhofer, Heidelberg (DE); Helmut Stritt, Brühl (DE); Karl-Thomas Werner, Waghäusel-Wiesenthal (DE)

(73) Assignee: ABB Patent GmbH, Ladenburg (DE)

( * ) Notice: Subject to any disclaimer, the term of this patent is extended or adjusted under 35 U.S.C. 154(b) by 78 days.

(21) Appl. No.: 10/252,993

(22) Filed: Sep. 23, 2002

(65) Prior Publication Data

US 2003/0072112 A1 Apr. 17, 2003

(30) Foreign Application Priority Data

Sep. 21, 2001 (DE) .......................................... 101 46 502

(51) Int. Cl.$^7$ ................................................. H02H 3/00
(52) U.S. Cl. ........................... 361/62; 361/63; 361/93.1
(58) Field of Search ............................. 361/62, 63, 88, 361/93.1

(56) References Cited

U.S. PATENT DOCUMENTS 6,636,401 B1 * 10/2003 Meiners et al. ............... 361/62

FOREIGN PATENT DOCUMENTS

| DE | 39 08 481 A1 | 1/1990 |
|---|---|---|
| DE | 90 05 005.3 U1 | 8/1990 |
| DE | 295 14 867 U1 | 1/1996 |
| DE | 195 40 329 A1 | 4/1997 |
| DE | 196 28 957 A1 | 1/1998 |
| DE | 197 53 843 A1 | 8/1998 |
| EP | 1 073 148 A2 | 1/2001 |

* cited by examiner

Primary Examiner—Stephen W. Jackson
Assistant Examiner—James A Demakis
(74) Attorney, Agent, or Firm—Laurence A. Greenberg; Werner H. Stemer; Gregory L. Mayback

(57) ABSTRACT

An electrical service distribution board is accommodated in a housing, has a feed conductor that is inserted into the housing and has outgoer conductors that lead to individual loads. Electrical service devices with different protection tasks, such as fault current protection, short circuit or over-current protection and the like, which can be connected to the feed conductor and to the outgoer conductors by a plug connection via a connection system which contains connection conductors connected to them. A mounting plate is providing for holding the service devices, with the connection conductors disposed underneath the mounting plate and the mounting plate having openings into which plug elements which are disposed on the service devices can be inserted.

22 Claims, 8 Drawing Sheets

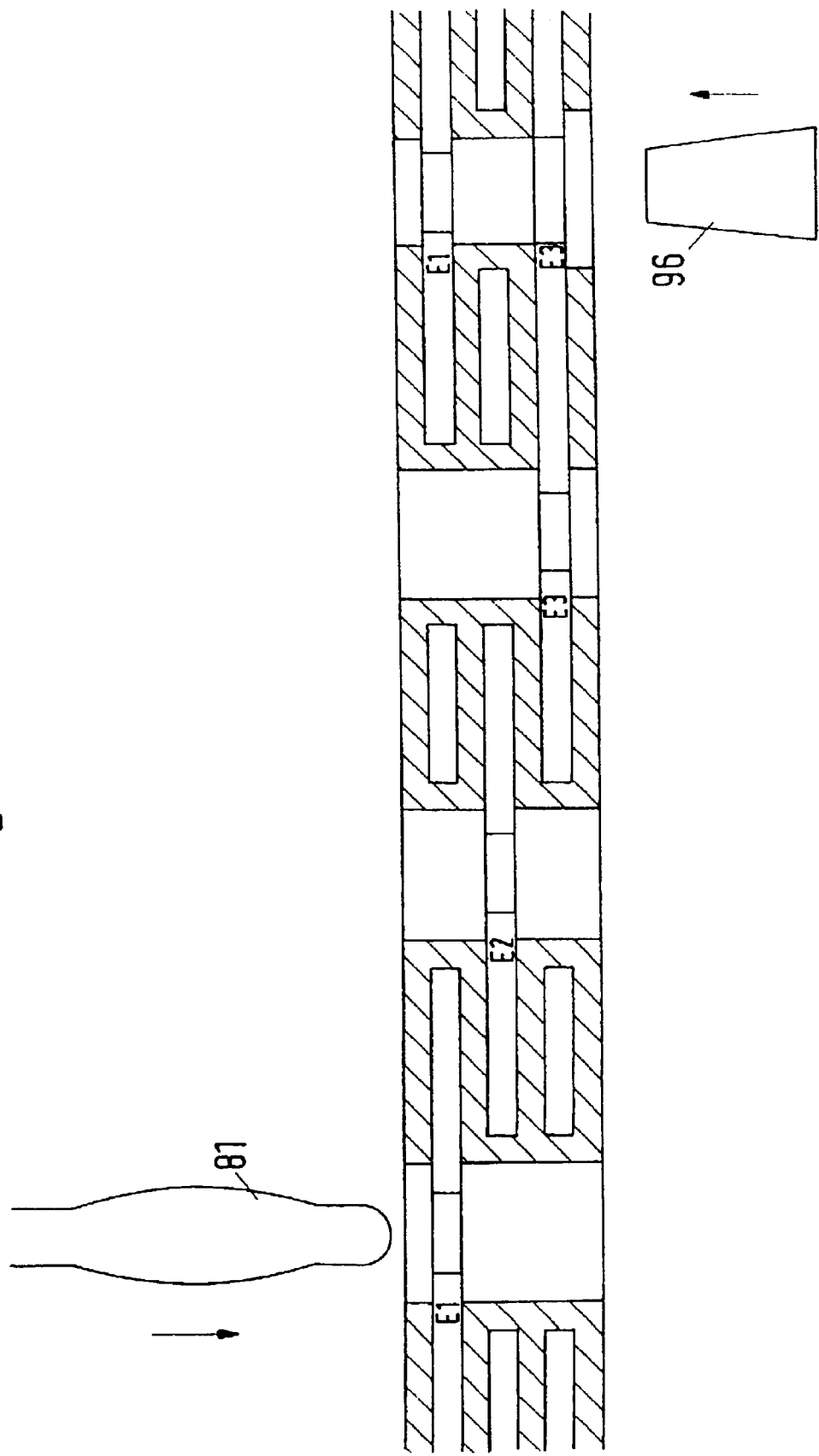

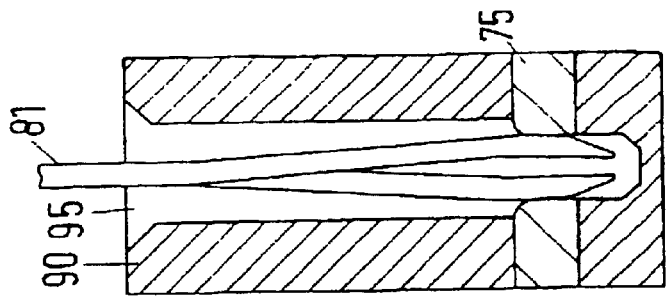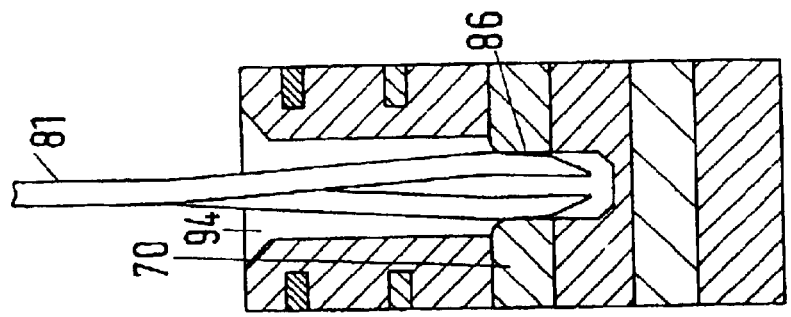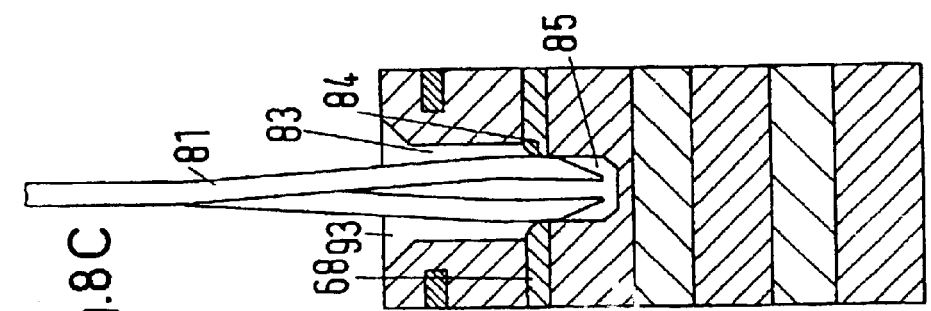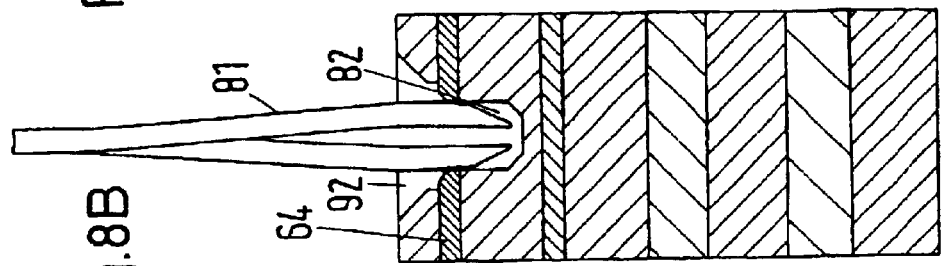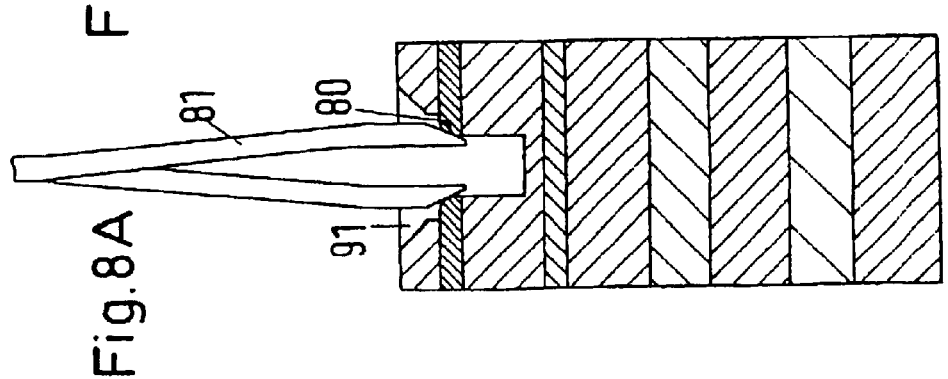

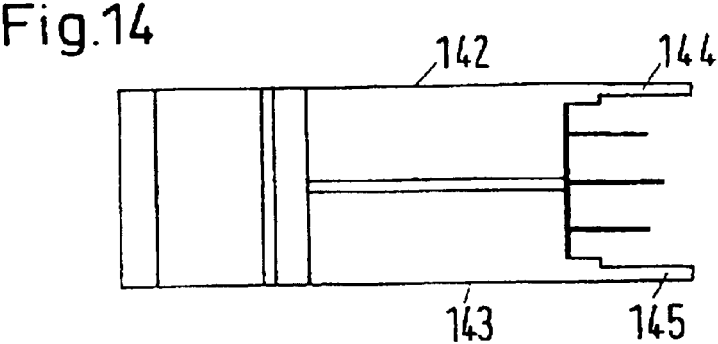
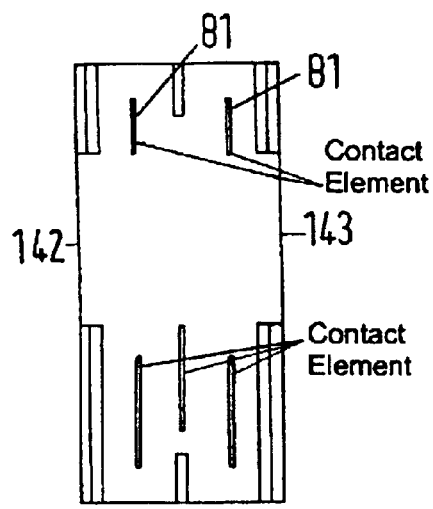
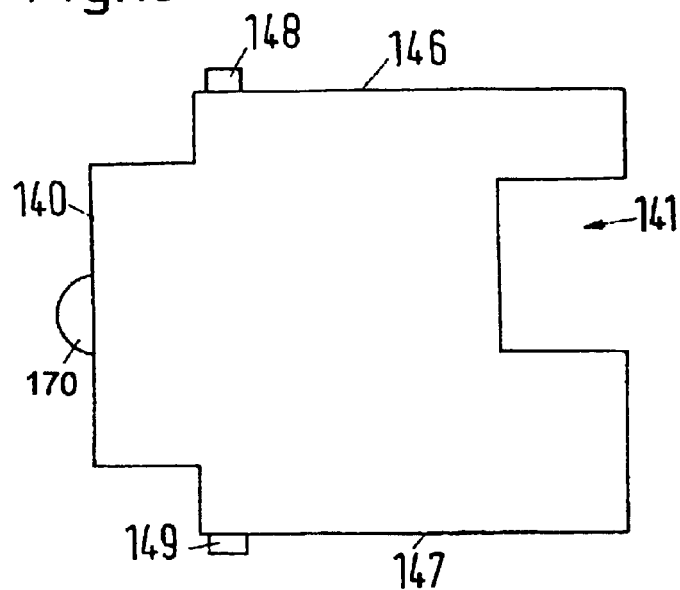
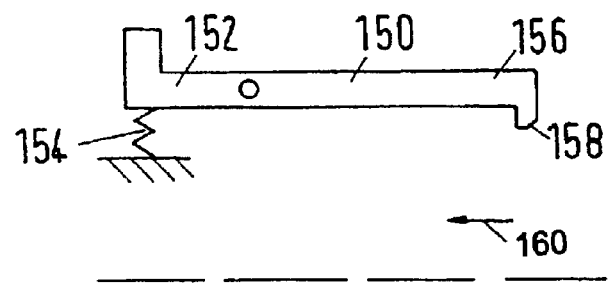
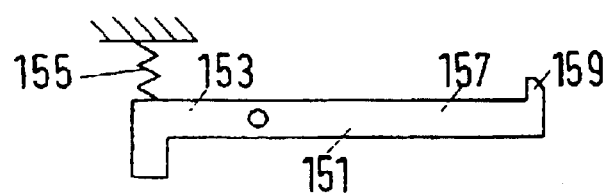

ELECTRICAL SERVICE DISTRIBUTION BOARD

BACKGROUND OF THE INVENTION

Field of the Invention

The invention relates to an electrical service distribution board that is accommodated in a housing, has a feed conductor that is inserted into the housing and outgoer conductors that lead to individual loads. Electrical service devices are provided with different protection tasks, such as fault current protection, short circuit or overcurrent protection and the like, which can be connected to the feed conductor and to the outgoer conductors by a plug connection via a connection system which contain connection conductors connected to them. A mounting plate for holding the service devices is provided. The connection conductors are disposed underneath the mounting plate and the mounting plate has openings into which plug elements that are disposed on the service devices can be inserted.

Service distribution boards such as these are installed for electrical power distribution and protection in buildings. Circuit breakers, fault current circuit breakers and the like are accommodated in a service distribution board housing and are intended to protect individual loads within a network.

Housings such as these normally contain top-up profile mounting rails at the bottom of the housing, onto which the switching devices are snapped. The switching devices are connected to one another phase-by-phase by busbars, with only one busbar being used for single-phase devices, and so-called busbar blocks being used for polyphase applications, which have a busbar holding housing with a number of chambers, and ribbon conductors inserted into the chambers, with connecting lugs being provided on the ribbon conductors, which can be inserted into connecting terminals on the switching devices, and can be clamped firmly in them. If a number of top-up profile mounting rails are disposed one above the other, then connection conductor configurations are provided, to which the individual busbars are connected.

Published, Non-Prosecuted German Patent Application DE 196 28 957 A1 discloses a service distribution board which has a housing in which ribbon conductors are accommodated, on which connecting lugs are integrally formed which have contact tulips, into which plug lugs which are disposed on the lower face of the switching devices can be inserted, with a top-up profile mounting rail onto which the switching devices are snapped being fitted to the housing. When they are snapped on, the plug lugs make an electrically conductive contact with the contact tulips through openings that are provided in the housing. The switching devices that are used are those which have a normal switching device form; the plug lug is just fitted on the lower face instead of screw connecting terminals, into which electrical conductors can be inserted through openings on the narrow faces.

In comparison to conventional distribution boards, the configuration considerably simplifies the mounting process to the extent that, at least on the access side of the switching device, there is no longer any need to firmly clamp an electrical conductor or a connecting lug by a tool.

A feed line is inserted into the distribution board and is connected to the busbars. Outgoer lines which are associated with the individual switching devices are laid within the service distribution board housing and are passed out of the housing, with the outgoer lines being connected to the feeders to the loads. In this case, incorrect connections can occur due to confusion, for example with a load that is to be protected by a fault-current circuit breaker incorrectly being connected to a circuit breaker.

SUMMARY OF THE INVENTION

It is accordingly an object of the invention to provide an electrical service distribution board which overcomes the above-mentioned disadvantages of the prior art devices of this general type, which is even easier to install, and in which incorrect connections are avoided.

With the foregoing and other objects in view there is provided, in accordance with the invention, an electrical service distribution board. The distribution board contains a housing, a feed conductor inserted into the housing, outgoer conductors leading to individual loads, and electrical service devices with different protection tasks such as fault current protection, short circuit protection, and/or over-current protection. A connection system is provided and has connection conductors. A plug connection connects the electrical service devices to the feed conductor and the outgoer conductors through the connection system. Plug elements are disposed on the electrical service devices. A mounting plate for holding the electrical service devices is provided. The connection conductors are disposed underneath the mounting plate and the mounting plate has openings into which the plug elements disposed on the electrical service devices are inserted. A base module provides a basic function and/or a basic protection function being associated with the electrical service devices, and the base module is disposed in the housing. At least one circuit module with specific additional protection functions such as a short-circuit protection, overcurrent protection, and/or fault current protection, is provided. The specific additional protection functions are matched to the basic function and the basic protection function of the base module and interact with them. An outgoer module is connected to the outgoer conductors leading to the individual loads.

According to the invention, the service distribution board has a base module which has the basic and/or basic protection functions, at least one device which is in the form of a circuit module and has specific additional protection functions, which are matched to the basic and/or basic protection functions in the base module and interact with them, and an outgoer module for the connection of connecting conductors which lead to the loads.

The individual functions are thus separated into basic functions and/or basic protection functions, which must be provided in every service distribution board, and into those functions that interact with them and are contained in the circuit modules. By way of example, a circuit breaker function is accommodated in a circuit module; the short-circuit protection function which is provided in the base module corresponds to a contact opening, as is provided in a selective main switch.

The basic protection function may, for example, contain a short-circuit protection which, for example, can be formed by a dynamic contact opening configuration or by a resistor with a positive temperature coefficient, both of which are accommodated in the base module, fault-current protection with fire protection, and overvoltage protection. In this case, it is possible to set a fault current which is approximately 300 mA.

The functions which are located in the circuit modules may have a short-circuit, fault-current and overvoltage protection function, with the short-circuit function corresponding, for example, to that of a circuit breaker, and with the short-circuit protection function in the base module acting like a selective main circuit breaker.

A timer or the like may also be provided in one of the circuit modules.

The service distribution board has an associated control unit, by which the functions of the base module and of the circuit modules can be adjusted. In this case, the basic protection functions may be adjusted only by a technician; certain functions in the circuit modules, for example in the timer, may then be changed by the user.

The individual connection conductors between the base module and the circuit modules are configured in a particularly advantageous manner in the form of prefabricated busbars, which are installed in fixed positions in the service housing.

According to a further advantageous refinement of the invention, display and control panels may be provided on the front face of each device that is in the form of a circuit module, for example for switch position indication or for on and off switching operations. In this case, each circuit module may also be equipped with basic functions; the control unit may be used to configure the circuit module.

According to one further advantageous refinement and improvement of the invention, the connection conductors between the base module and the circuit modules are in the form of prefabricated busbars. In this case, the busbars and/or connection conductors to which the circuit modules are connected are accommodated in at least one busbar housing, on which the access openings for all the functions to the busbars are provided. The busbars are connected via plug pins. According to the invention, the base module together with the control unit and a first number of circuit modules forms a basic unit, which can be expanded by an additional unit which may accommodate only circuit modules. The circuit modules in the additional unit may be actuated and configured from the control unit, or by the control unit for the basic unit. The service distribution board can thus be expanded as required.

The individual circuit modules can be plugged and latched onto the busbar housing, with an identical configuration of plug elements being provided for circuit modules with the same functions, so that loads that can be protected by the same protection are protected only by circuit modules that are matched to them.

According to one further refinement of the invention, the contact openings and plug elements for each circuit module may be associated with one another in the same way or differently for each opening area, so that only in each case one circuit module of one specific type can be fitted to each opening area.

The plug elements are preferably in the form of pins which are sprung in the radial direction with respect to their longitudinal axis, can be inserted into holding openings in the busbars, and are electrically and mechanically firmly connected to them.

One preferred refinement of the invention may contain the capability to associate coupling elements, for coupling to a bus system (EIB) with at least the base module and/or the control unit. It is thus possible to dispose the service distribution board in a row in a bus system for a building, for example in accordance with EIB regulations and requirements.

Other features which are considered as characteristic for the invention are set forth in the appended claims.

Although the invention is illustrated and described herein as embodied in an electrical service distribution board, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a sectional view through a busbar housing;

FIGS. 8A–8E are section views through the busbar housing with different degrees of making contact;

FIG. 12 is a bottom, plan view of a refinement of a service device;

FIG. 13 is a side-elevational view of the service device shown in FIG. 12;

FIG. 14 is a view of a narrow face of the service device shown in FIGS. 12 and 13; and FIG. 15 is an illustration of a device lock, by which the service device can be fixed on a busbar housing.

DESCRIPTION OF THE PREFERRED EMBODIMENTS

Figure 1:
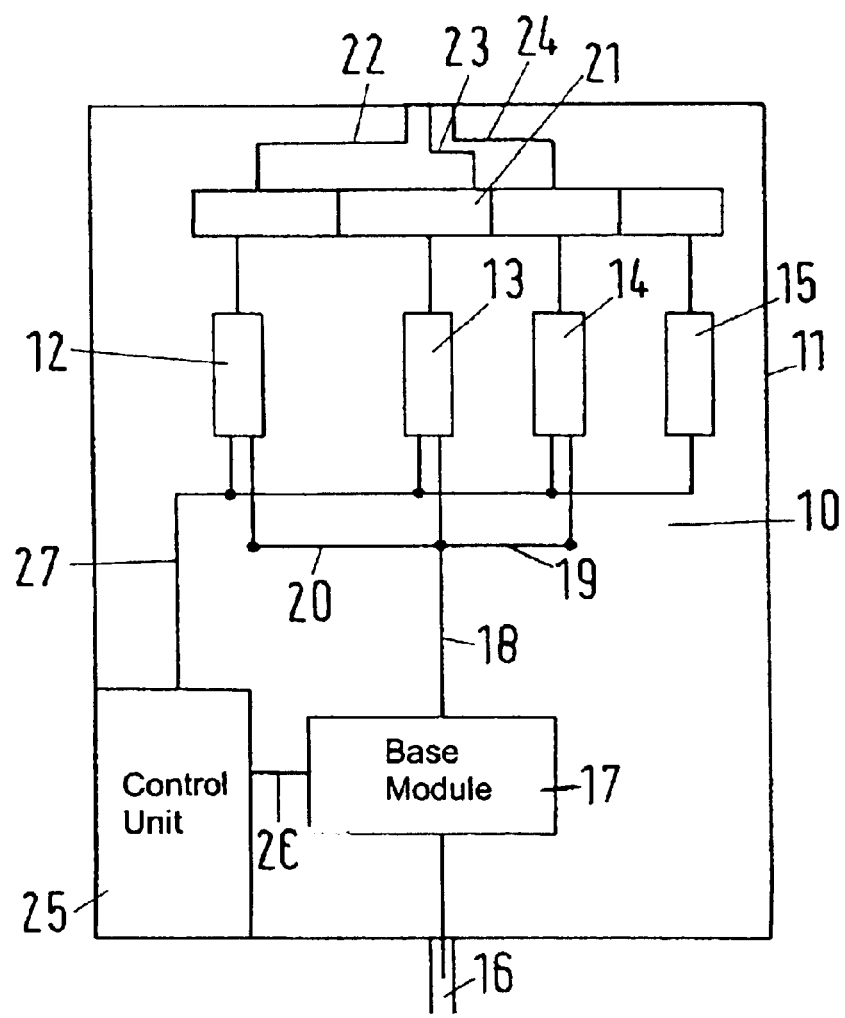
FIG. 1 is a diagrammatic, plan view of a service distribution board according to the invention.

Referring now to the figures of the drawing in detail and first, particularly, to FIG. 1 thereof, there is shown an input line 16, which is connected to a network that originates from a power supply, leads into a service distribution board 10, which has a housing 11. The input line or input cable 16 leads to a base module 17, whose functions are described further below. A distribution line 18 leads from the base module 17 to busbars 19 and 20, which are connected to circuit modules 12, 13, 14, which are also referred to for short as modules here, in which specific protection functions are accommodated. An output side of the modules 12 to 14 is connected to a distribution strip 21, to which connecting conductors 22, 23, 24 are connected, which lead to loads.

In addition, a module 15 is provided which, for example, is used as a timer and/or contains a timing function.

The service distribution board 10 contains a control unit 25, from which the base module 17 and the individual modules 12 to 15 can be configured. The signals that originate from the control unit 25 are supplied via control lines 26 to the base module 17, and via control lines 27 to the individual circuit modules 12 to 15.

The base module 17 is intended to carry out the now described tasks in this case.

All service switching devices that are formed by the modules have specific protection functions, which are matched to a specific load. All the protection functions of the modules are associated with basic protection functions which are the same for all modules, for example the basic protection function of fault-current protection and/or fire protection, the basic protection function of over-voltage protection and the basic protection function of short-circuit protection. The basic protection functions are provided in the base module 17.

The basic protection functions being "fault current and/or fire protection" are provided by a conventional fault-current detection device, in which the fault-current protection and/or the fire protection is set, for example, to 300 mA. Fault currents that are less than 300 mA are then protected by the individual modules.

A further basic protection function is over-current protection. The over-current protection is produced by a bimetallic strip in a normal, commercially available circuit breaker and the corresponding basic protection function can likewise be produced by a bimetallic strip or by a memory alloy in the base module. The basic protection function of "short-circuit protection" may be achieved by a main circuit breaker, a resistor which is dependent on rated current and has a positive temperature coefficient, or by a dynamic break contact; the short-circuit protection function is then achieved together with the individual modules.

The control unit 25 is provided in order that the individual basic protection functions can be adjusted and, furthermore, in order that the modules can also be provided with specific parameters in a specific manner, and the control unit 25 has a control and display interface and is operated by the technician while the installation is being set up, in order that the individual modules 12–15 and the base module 17 can be set as required.

In addition to the modules 12 to 15 mentioned here, further modules may also be provided, having further control, switching and protection functions.

Figure 2:
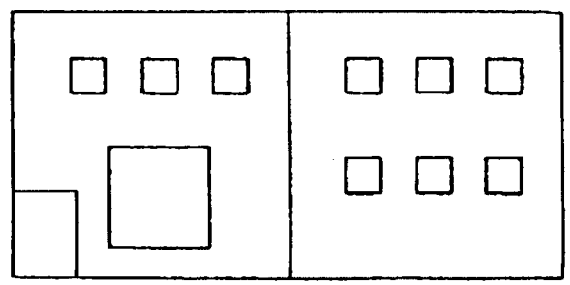
FIG. 2 is a diagrammatic illustration of two modules.

By way of example, FIG. 2 shows a plan view of two modules with different functions.

Figure 3:
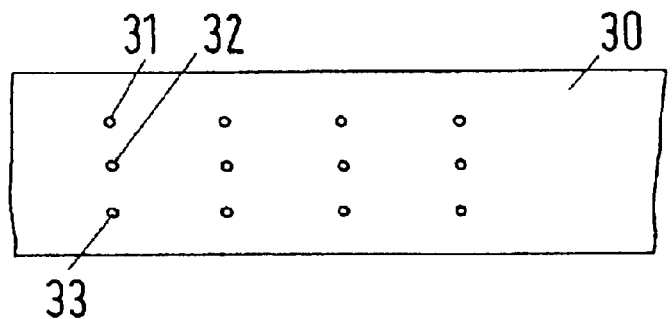
FIG. 3 is an illustration of a busbar configuration.
Figure 4:
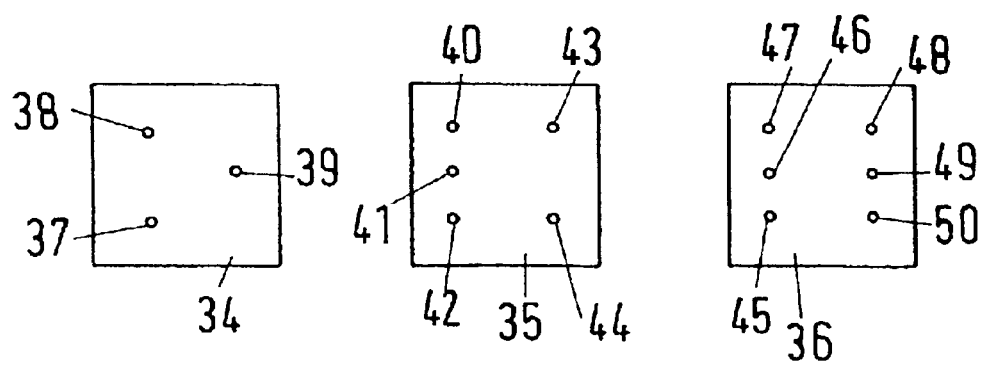
FIG. 4 is a plan view of a module from underneath.

The individual modules 12 to 15 are fitted to a busbar housing 30, and are latched to it (FIG. 3). The busbar housing 30, which will be described in more detail further below, has access openings 31, 32 and 33 etc., via which the modules 34, 35 and 36 that are illustrated in FIG. 4 can be inserted. FIG. 4 shows a plan view from underneath of the module 34, in which a total of three plug pins 37, 38 and 39 project on the lower face. In the module 35, five plug pins project 40 to 44 are provided, and in the module 36 six plug pins 45, 46, 47, 48, 49 and 50 are provided.

Figure 5:
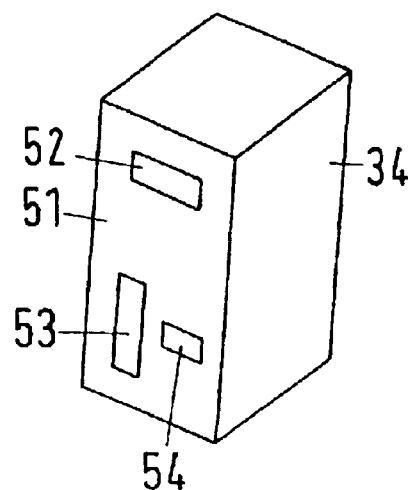
FIG. 5 is a perspective view of the module.

FIG. 5 shows a schematic illustration of a module, for example the module 34, on whose front face 51 display windows 52 as well as control elements 53 and 54 are provided.

The invention has been explained and described in detail with reference to an exemplary embodiment. Many modified forms are, of course, possible, which are all based on the basic principle of the invention. It is self-evident that the individual modules may have different physical configurations. The way in which the busbars are associated with one another or the way in which the modules are fixed on the busbars and/or on the busbar housings is of minor importance. What is important for the invention is the association of the base module 17 with the modules 12–15 with the corresponding basic protection functions, the control unit 25, by which the base module 17 and the modules 12–15 can be configured and, furthermore, the association of the output terminals with one another such that network conductors coming from the loads can be connected to appropriately coded contact elements.

FIGS. 6 to 15 show how a configuration of busbars could appear.

Figure 6:
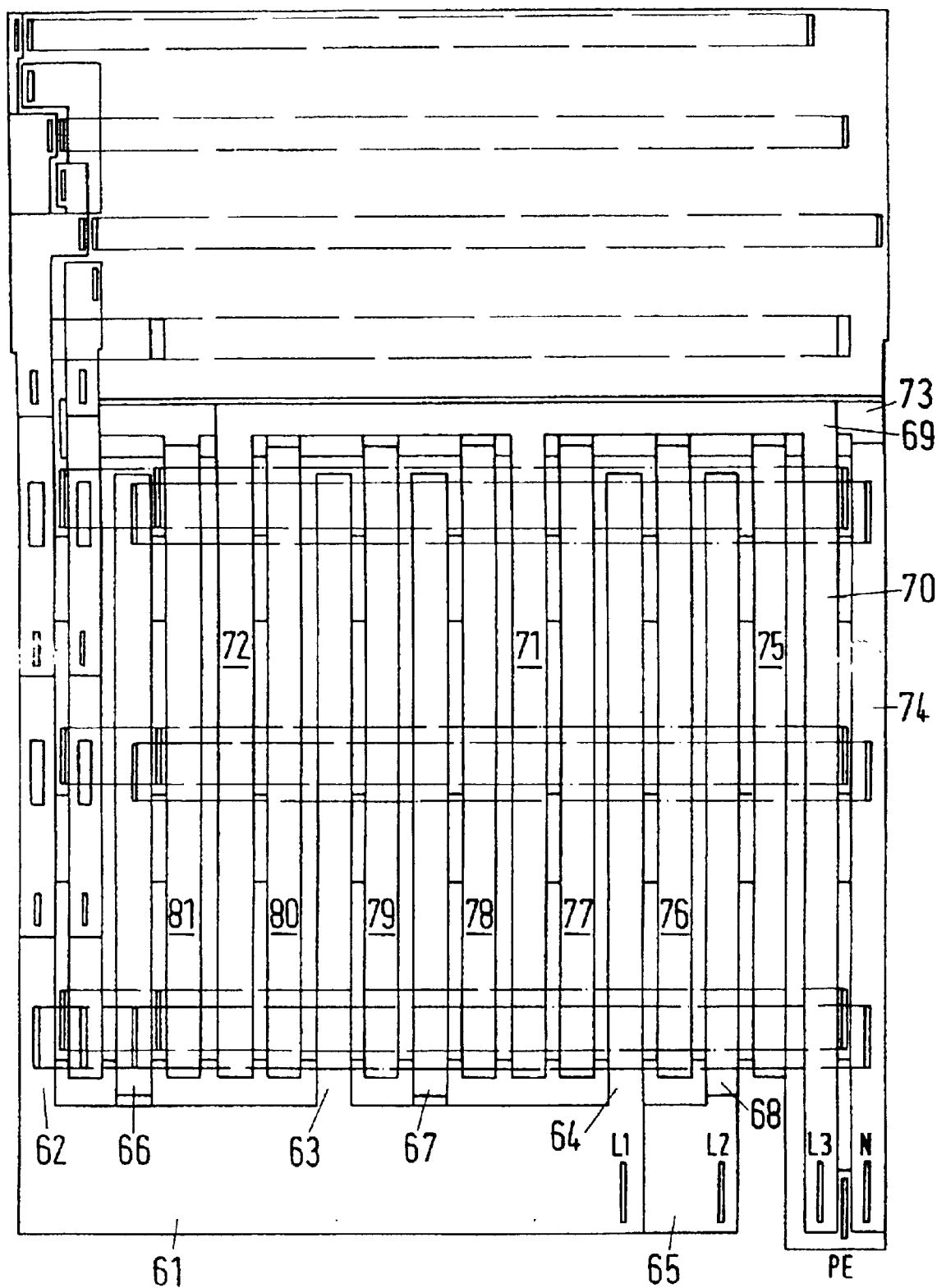
FIG. 6 is a diagrammatic, plan view of the individual phase busbars.

Reference is now made to FIG. 6.

FIG. 6 shows a plan view of a busbar configuration, which can be inserted in a busbar housing, as is illustrated in FIGS. 7 and 8.

The busbar L1 has a connection piece 61 that runs at right angles to the direction in which the modules are disposed in a row and on which tongues 62, 63 and 64 are integrally formed at right angles thereto. A length of the connection piece 61 corresponds to the distance between the modules, and the length of the tongues 62 to 64 corresponds to the length of the row of modules, seen in the direction of the row.

The busbar L2 is constructed in a similar way. The busbar L2 has a connection web 65, on which a number of tongues 66, 67 and 68, corresponding to the number of phases, are integrally formed. The tongues 66 and 62, 67 and 63, 68 and 64 run parallel to one another and project in the same direction from the connection webs 61, 65.

These two-phase conductors L1, L2 have an associated third phase conductor L3, which has a connection part 69 on which tongues 70, 71 and 72 are integrally formed. The connection part 69 is located in the vicinity of the ends of the tongues 62, 66; 63, 67; 64, 68, and the tongues 70, 71 and 72 project in the opposite direction to the connection pieces 61 and 65.

The three phase conductors have an associated neutral conductor N, which has a similar construction, with a connection piece 73 underneath the connection piece of 69, and with tongues 74, 75, 76, 77, 78, 79, 80, 81 which project in the same direction as the tongues 70, 71 and 72. A plate, which is located underneath the individual phase busbars L1–L3 and the neutral conductor N, is also provided, as a protective ground conductor.

FIGS. 8–8E show a cross-section through the busbars, which are embedded in an insulating material 90. As can be seen, the individual busbars L1, L2, L3, N are disposed in different planes. By way of example, the busbar L1 is located with its tongue 64 in the first plane, which is to say in the uppermost plane. As can be seen, the busbar or tongue 64 has openings 80, through which contact springs 81 engage, which will be described in more detail further below. On the extreme left in the drawing in FIG. 8A, the contact spring 81 is currently being inserted into the opening 80; in FIG. 8B, the contact spring 81 has engaged in a blind hole 82 located underneath the tongue 64.

The tongue 68 is located in the plane underneath the tongue 64. The contact spring element 81 comes into contact with the tongue 68 through an aperture opening 83, with the tongue 68 passing through an opening 84 in the tongue 68 and engaging into a blind hole 85 located underneath. Contact with the tongue 64 is avoided by configuring the aperture opening 83 to be sufficiently large.

The tongue 70 could be provided, by way of example, in the plane located further below, through whose opening 86 the contact spring 81 is passed. In FIG. 8E, the contact spring 81 makes contact with a busbar in the fourth plane, which is to say with the tongue 75 for example of the neutral conductor N.

FIGS. 8A–8E show that the individual busbars are embedded in the insulating material body 90, which has access to openings 91, 92, 93/84, 94 and 95 to the individual tongues.

The drawing in FIG. 7 shows the configuration as shown in FIGS. 8A–8E illustrated schematically, but with only three planes of the busbars, rather than four planes, located one above the other.

The contact spring in FIG. 7 has the same reference number 81, although its configuration is slightly different, in order to illustrate the similarity with regard to its function.

FIG. 7 also shows a contact plug 96, which connects busbars, which are located in plane E1 and plane E3, to one another. FIG. 11 shows the reason why this is necessary. The insulating material housing 100 which holds the busbars, and corresponds to the insulating material housing 90 in FIGS. 8A–8E, has openings 101, 102, 103, 104, 105 and 106 as well as openings 107, 108 and 109.

Figure 11A:
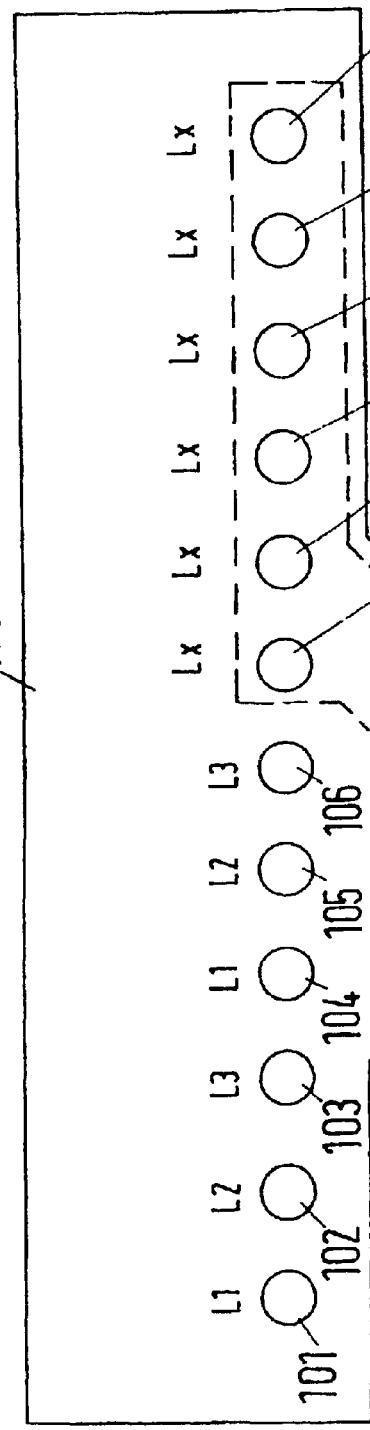
FIGS. 11A and 11B are illustrations of a subregion of a busbar configuration.
Figure 11B:
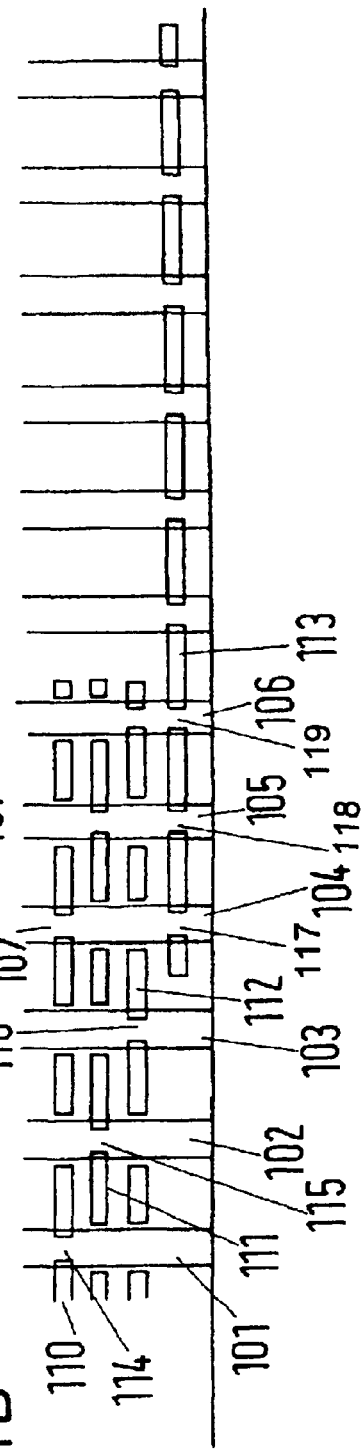

FIG. 11B show a section, which corresponds to FIGS. 8A–8E, through the busbar housing 100; a total of four busbar planes 110, 111, 112 and 113 are provided in this case. The busbar 110, which is located in the region of the opening 101, has an aperture 114 that is smaller than the diameter of the hole 101. In the aperture 102, the busbar 111 has an aperture 115, which is of the same size as the aperture 114, and is thus smaller than the hole 102. In the region of the hole 103, the busbar 112 has an aperture 116, whose internal diameter corresponds to the internal diameter 114 and 115. If a module with the contact springs 81, for example contact fingers as shown in FIGS. 8A–8E, is now inserted into the openings 101, 102, 103, then the contact springs 81 make contact first with the busbar 110 and furthermore with the busbar 111 and the busbar 112.

The busbar 114 is located underneath these three busbars 110, 111, 112; as can be seen, the busbar 113 has openings 117, 118 and 119. The openings 117 to 119 have the same diameter as the opening 114, 115 and 116, and are located one above the other, so that the phase of the busbar 110 can be connected to the busbar 113 by a contact piece, for example the contact piece 96. For this purpose, the contact piece 96 that connects the busbars 110 and 113 to one another is inserted into the opening 107.

The busbar 111 could make contact with the busbar 113, and the busbar 112 could make contact with the busbar 113, in the same way.

Further holes, 120, 121, 122, 123, 124 and 125, which thus lie in a line, are provided to the right of the holes 101 to 106 in FIG. 11A. Service devices that are inserted into the holes 120 to 125 can then be connected as required via the busbar 113 to that phase which is provided in the busbar 110, in the busbar 111 or in the busbar 112. FIG. 11 shows a corresponding connection line 126, represented by a dashed line.

Figure 10:
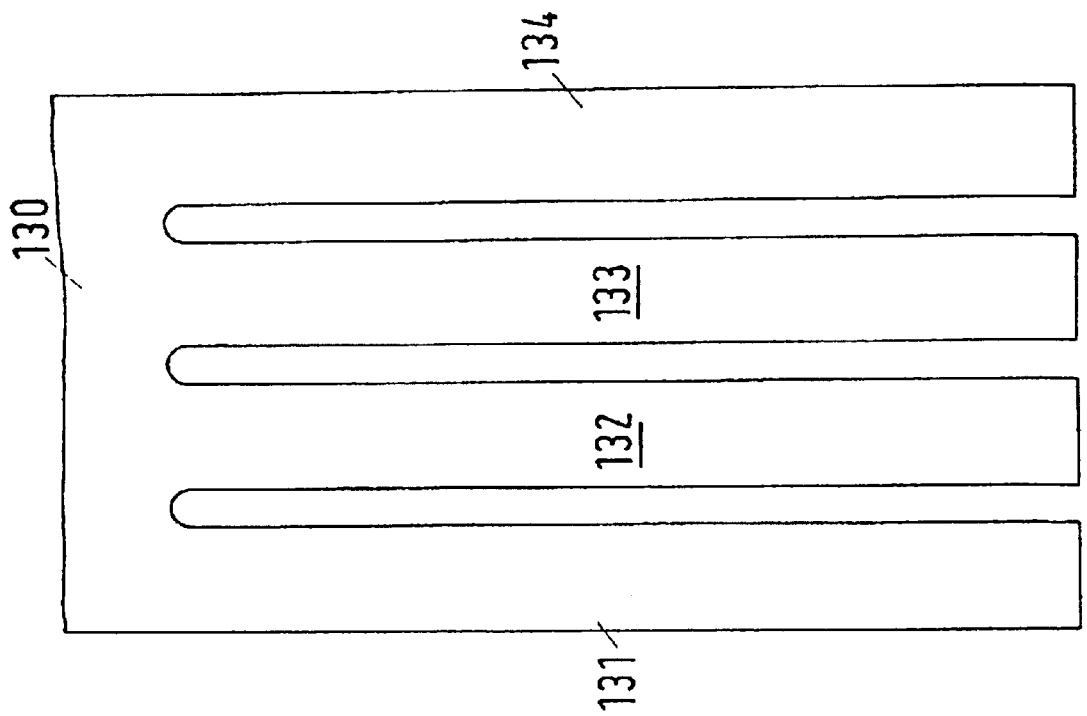
FIG. 10 is a front-elevational view of the contact pin.
Figure 9:
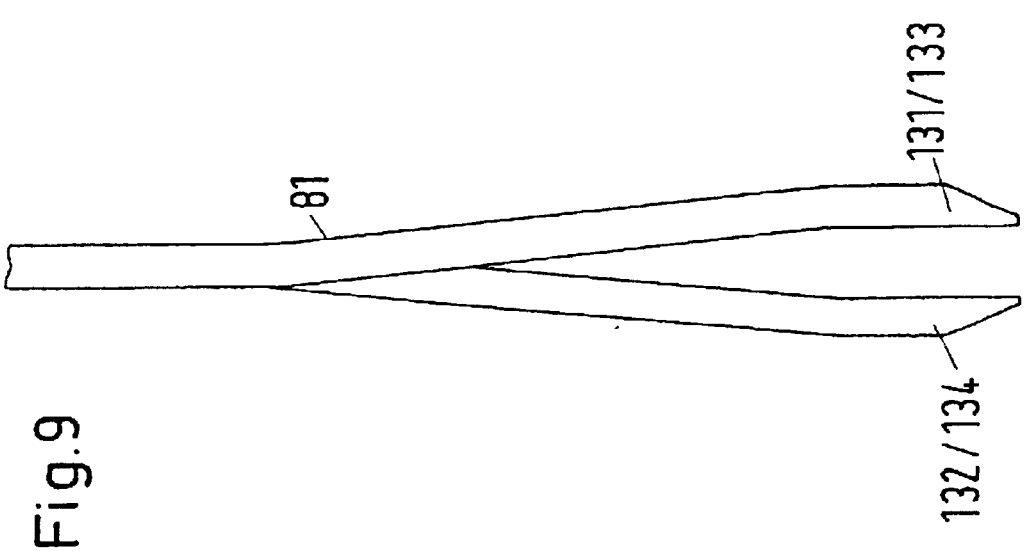
FIG. 9 is a side-elevational view of a contact pin.

FIGS. 9 and 10 show a contact spring 81. Tongues 131, 132, 133 and 134 are integrally formed in the form of tines on a common contact support 130, and are bent with respect to one another as can be seen in FIG. 9. The tines 131 and 133 are bent out to the right (see FIG. 9) there, and the tongues 132 and 134 are bent out to the left.

FIGS. 12 to 15 show a refinement of a service device. The device is configured approximately in a T shape or cap shape with a front face 140 and a mounting face 141. The front face 140 has a surface with control elements 170. The contact springs 81 on the mounting face point toward one another in an appropriate configuration.

Webs 144 and 145 are connected to the broad faces 142 and 143, lie in the same plane as the broad faces, and are used to guide the device in the housing for the busbars.

Projecting tabs 148, 149 are integrally formed on the narrow faces 146 and 147, and can be used to fix the service device by the device lock as shown in FIG. 10. The configuration shown in FIG. 15 has two double armed levers 150 and 151 that are mounted such that they can rotate, with springs 154 and 155 acting on the lever arms 152 and 153 which face the mounting face, and the springs 154 and 155 force the arms 152, 153 apart from one another—and the other arms 156 and 157 toward one another. Free ends of the arms 156 and 157 have tabs 158 and 159 that point toward one another. During installation, the tabs 158 and 159 engage behind the strips 148 and 149, with the module being inserted with the bottom face 141 in the direction of the arrow 160 between the two double armed levers 51 and 151.

We claim:

1. An electrical service distribution board, comprising:
   a housing;
   a feed conductor inserted into said housing;
   outgoer conductors leading to individual loads;
   electrical service devices with different protection tasks selected from the group consisting of fault current protection, short circuit protection, and over-current protection;
   a plug connection;
   a connection system having connection conductors, said plug connection connecting said electrical service devices to said feed conductor and said outgoer conductors through said connection system;
   plug elements disposed on said electrical service devices;
   a mounting plate for holding said electrical service devices,
   said connection conductors disposed underneath said mounting plate and said mounting plate having openings formed therein into which said plug elements disposed on said electrical service devices being inserted;
   a base module providing at least one of a basic function and a basic protection function being associated with said electrical service devices, said base module disposed in said housing;
   at least one circuit module with specific additional protection functions selected from the group consisting of short-circuit protection, overcurrent protection, and fault current protection, the specific additional protection functions being matched to the basic function and the basic protection function of said base module and interact with them; and
   an outgoer module connected to said outgoer conductors leading to the individual loads.

2. The service distribution board according to claim 1, wherein the basic protection function includes at least one short-circuit protection function.

3. The service distribution board according to claim 1, wherein the basic protection function includes at least one of a fault current protection function and a fire protection function.

4. The service distribution board according to claim 3, wherein at least one of the fault current protection function and the fire protection function is set to 300 mA.

5. The service distribution board according to claim 1, wherein the basic protection function includes an over-voltage protection function.

6. The service distribution board according to claim 1, wherein the basic protection function is a short-circuit protection function achieved by a device selected from the group consisting of a main line circuit breaker, a current-dependent resistor with a positive temperature coefficient, and a dynamic break contact, said device providing the short-circuit function together with said circuit module.

7. The service distribution board according to claim 1, wherein the basic function contains a timer function.

8. The service distribution board according to claim 1, further comprising:
   a control unit; and
   means for coupling at least said base module, said control unit and all other components of the service distribution board, to a bus system.

9. The service distribution board according to claim 1, further comprising a control unit connected to said base module, said control unit functioning as an input and output unit, by which the basic protection function of said base module and the specific additional protection functions of the circuit module can be set.

10. The service distribution board according to claim 9, wherein said at least one circuit module is one of a plurality of circuit modules, one of said circuit modules is a timer that is connected to and adjusted by said control unit.

11. The service distribution board according to claim 1, wherein said circuit module has a front face and display and control panels provided on said front face, said display and control panels providing at least one of a switch position indication and a switching on and off capability.

12. The service distribution board according to claim 9, wherein said at least one circuit module is one of a plurality of circuit modules and each of said circuit modules is equipped with certain basic functions and can be configured by said control unit.

13. The service distribution board according to claim 1, wherein said base module is one of at least two base modules; and
   further comprising at least two associated auxiliary switch modules for switching and controlling all poles.

14. The service distribution board according to claim 1, wherein:
   said at least one circuit module is one of a plurality of circuit modules; and
   said connection conductors are prefabricated busbars disposed between said base module and said circuit modules.

15. The service distribution board according to claim 1, further comprising a busbar housing accommodating said connection conductors embodied as busbars, said busbar housing having access openings formed therein for connecting said electrical service devices to said busbars.

16. The service distribution board according to claim 15, wherein said electrical service devices can be one of plugged and latched onto said busbar housing, with an identical configuration of said plug elements being provided for said electrical service devices having equivalent functions, so that the individual loads to be protected by the same protection are protected only by said electrical service devices which are matched to them.

17. The service distribution board according to claim 15, wherein:
   said at least one circuit module is one of a plurality of circuit modules; and
   said circuit modules are fixed by said plug elements to said busbars.

18. The service distribution board according to claim 9:
   wherein said at least one circuit module is one of a plurality of circuit modules;
   further comprising at least one additional unit containing only additional circuit modules; and
   said base module together with said control unit and a first number of said circuit modules form a basic unit, said basic unit can be expanded by said at least one additional unit containing only said additional circuit modules, and in that said circuit modules in said additional unit can be actuated and configured by said control unit of said basic unit.

19. The service distribution board according to claim 15, wherein said busbars have busbar openings formed therein, and said plug elements for each of said electrical service devices are associated with one another in a same way or differently for each of said busbar openings, so that only in each case one of said electrical service devices of one specific type can be fitted to each pattern of busbar openings.

20. The service distribution board according to claim 15, wherein:
   said busbars having holding openings formed therein; and
   said plug elements are pins sprung in a radial direction with respect to a longitudinal axis, said pins disposed in said holding openings in said busbars and are electrically and mechanically firmly connected to a said busbars.

21. The service distribution board according to claim 1, wherein the basic function and the basic protection function include overvoltage protection and current limiting protection.

22. The service distribution board according to claim 1, further comprising a busbar housing accommodating said connection conductors embodied as busbars, said busbar housing having access openings formed therein for connecting said circuit module to said busbars.

* * * * *